United States Patent
Zhu et al.

(10) Patent No.: US 7,848,333 B2
(45) Date of Patent: Dec. 7, 2010

(54) METHOD OF MULTI-PORT VIRTUAL LOCAL AREA NETWORK (VLAN) SUPPORTED BY MULTI-PROTOCOL LABEL SWITCH (MPLS)

(75) Inventors: Wei Zhu, Nanjing (CN); Bo Chen, Nanjing (CN); Jianbing Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 703 days.

(21) Appl. No.: 10/565,352

(22) PCT Filed: Jul. 27, 2004

(86) PCT No.: PCT/CN2004/000869

§ 371 (c)(1),
(2), (4) Date: Jun. 14, 2006

(87) PCT Pub. No.: WO2005/011197

PCT Pub. Date: Feb. 3, 2005

(65) Prior Publication Data

US 2007/0127502 A1 Jun. 7, 2007

(30) Foreign Application Priority Data

Jul. 31, 2003 (CN) ................ 03 1 44081

(51) Int. Cl.
*H04L 12/28* (2006.01)
(52) U.S. Cl. .............. 370/397; 370/399; 370/395.5
(58) Field of Classification Search ............ 370/230, 370/237, 235, 238, 464; 709/227, 229, 220, 709/221, 223; 710/74
See application file for complete search history.

(56) References Cited

U.S. PATENT DOCUMENTS

| | | | |
|---|---|---|---|
| 2001/0049739 A1* | 12/2001 | Wakayama et al. | 709/230 |
| 2002/0138628 A1* | 9/2002 | Tingley et al. | 709/227 |
| 2002/0191572 A1* | 12/2002 | Weinstein et al. | 370/338 |
| 2003/0133412 A1* | 7/2003 | Iyer et al. | 370/235 |
| 2004/0017816 A1* | 1/2004 | Ishwar et al. | 370/395.53 |

FOREIGN PATENT DOCUMENTS

| | | |
|---|---|---|
| CN | 1433642 A | 7/2003 |
| KR | 315668 B | 11/2003 |
| WO | WO 02/01909 | 1/2002 |

* cited by examiner

*Primary Examiner*—Robert W Wilson
(74) *Attorney, Agent, or Firm*—Fish & Richardson P.C.

(57) ABSTRACT

The present invention provides a method of supporting a multi-port virtual local area network (VLAN) with a multi-protocol Label switch (MPLS), comprising steps of: establishing a label switching path (LSP) by the label distribution protocol (LDP), and obtaining information binding a forwarding equivalence class (FEC) and a label or information binding an ingress label and an egress label, and an address of a LDP peer entity at an opposite end, which is a next-hop IP address; the MPLS table item managing module creating a forwarding-relation table, and adding a forwarding-relation table item based upon the obtained information; obtaining an egress port corresponding to the forwarding-relation table item based upon the next-hop IP address; and accomplishing the MPLS via the egress port. With the present invention, it is possible to support the multi-port VLAN in a three-layer switch with the function of the MPLS and implement the MPLS in the VLAN.

8 Claims, 7 Drawing Sheets

METHOD OF MULTI-PORT VIRTUAL LOCAL AREA NETWORK (VLAN) SUPPORTED BY MULTI-PROTOCOL LABEL SWITCH (MPLS)

CROSS-REFERENCE TO RELATED APPLICATIONS

This application is a national phase application of International Application No. PCT/CN2004/000869, filed on Jul. 27, 2004, which claims priority to Chinese Patent Application No. 03144081.9, filed on Jul. 31, 2003, both of which are hereby incorporated by reference in their entireties.

FIELD OF THE INVENTION

The present invention relates to the MPLS technology, and particularly to a method of supporting a VLAN with the MPLS.

BACKGROUND OF THE INVENTION

The MPLS was a protocol initially designed to improve the forwarding rate of a router. However, due to the behavior of the MPLS in the area of Traffic Engineering (TE) and Virtual Private Network (VPN), which are two key technologies in a current IP network, the MPLS has gradually become an important standard for expanding the scalability of the IP network. A key point of the MPLS protocol is the introduction of the concept of "label", which is both short and easy to process and has no topological information but local meaning. The label is short for an easy processing and can be directly referenced with an index. The label has only local meaning for the convenience of allocation.

The MPLS classifies node devices throughout the network as Label Edge Routers (LERs) and Label Switch Routers (LSRs). The LERs constitute an access part of a MPLS network, while the LSRs constitute a core part of the MPLS network. The LERs initiate or terminate a Label Switch Path (LSP) connection and achieve functions of forwarding conventional IP data packets and forwarding label packets. An ingress LER accomplishes classification and routing of the IP packets, generation of a forwarding table and a LSP table, and mapping of a Forwarding Equivalence Class (FEC) to the label. An egress LER terminates the LSP, and forwards the remaining packets based upon a stripped label. The LSR merely accomplishes the function of forwarding based upon a switch table. In this way, all the sophisticated functions are accomplished within the LER, while the LSR accomplishes only the function of high-speed forwarding.

FIG. 8 shows a network configuration test of the MPLS in the prior art, wherein all interconnecting interfaces between three routers are configured with an enabled Label Distribution Protocol (LDP) and operated with a routing protocol, and an ingress LER and a LSR can obtain an interface network segment route of 202.0.0.0/24 of an egress LER.

The egress LER assigns a label 30 to 202.0.0.0/24 and issues a mapping message to notify the LSR. A label 16 is newly assigned to the FEC: 202.0.0.0/24 on the LSR, and also a mapping message is issued to notify the ingress LER, so that a new correspondence relation is established for the FEC and the label.

For the ingress LER, if there is an incoming IP packet forwarded to the network segment of 202.0.0.0/24, then a Forwarding Information Base (FIB) will be searched, which is stored only on the ingress LER and records information of mapping the FEC to the label. An index of an egress interface can be known from 10.0.0.1, and in turn a specific egress port can be known due to the nature of routers. The label 16 is pushed so as to obtain a MPLS packet which is sent through the egress port corresponding to 10.0.0.1. At this time, the MPLS packet with the label 16 thus comes into being.

For the LSR, if there is an incoming packet with the label 16, then the label 16 within the MPLS packet is replaced by a label 30. The LSR knows the index of the egress interface from 20.0.0.1, and in turn the specific egress port can be known due to the nature of routers. Therefore, if the MPLS packet with the label 16 comes from the port of 10.0.0.2, the packet is subject to the replacement of the label and then sent from the egress port corresponding to 20.0.0.1. At this time, the label value of the MPLS message has already become 30.

For the egress LER, if the packet with the label 30 comes, then the label is stripped so as to obtain an IP packet, which is sent from the egress port corresponding to 202.0.0.0/24.

A conventional router plays various roles of route forwarding, a firewall and broadcast isolating etc within a network. However, within the network after the emergence of the VLAN, communication between logically-divided network segments still requires to be forwarded via a router. Due to a large quantity of data communicated between different VLANs over a LAN, if the router has to perform rooting once for each data packet, the router will become a bottleneck as the quantity of data over the network continuously increases. The three-layer switch technology combines the route technology and the switch technology. After a first data stream is routed, a mapping table is generated for a MAC address and an IP address. When the same data stream passes again, it will pass directly through the second layer instead of being routed again. Thus, it is possible to eliminate a network delay resulted from a route selection made by the router and improve the efficiency of forwarding the data packet. The forwarding of the router employs the mode of a longest match that is a complex implementation, and hence is commonly implemented with software. The route search of the three-layer switch is stream-oriented, which utilizes the CACHE technology and is easy to implement with an Application Specific Integrated Circuit (ASIC), thus possible to greatly reduce the cost and achieve a rapid forwarding.

The emergence of the tree-layer switch technology improves such a situation in which subnets in the network segments have to rely on the management of the router after the division into the network segments within the LAN, and overcomes the above network bottleneck caused by conventional low-speed and complex routers.

For a general router, an interface belongs to a specific physical port, and a relevant MPLS forwarding table item can know a specific physical port simply from a three-layer interface index. Due to intrinsic universality of protocols, many of the protocols in the three-layer switch are ported from a router platform, and thus a MPLS-related VLAN interface is limited to a single-port VLAN, that is, the MPLS feature only supports the single-port VLAN. In a port-based VLAN, several ports in the switch are defined as one VLAN, and sites in the same VLAN have the same network address. In another word, for the three-layer switch, one VLAN may contain a plurality of actual physical ports, and thus it is impossible for the relevant MPLS forwarding table item to directly obtain the specific physical port based upon the three-layer interface index.

SUMMARY OF THE INVENTION

In view of the above drawbacks, the present invention provides a method of supporting a multi-port virtual local area network (VLAN) with the multi-protocol Label switch (MPLS), wherein the VLAN includes a MPLS table item managing module and the method may comprise steps of:

establishing a label switch path (LSP) through a label distribution protocol (LDP), and obtaining information binding a forwarding equivalence class (FEC) and a label or information binding an ingress label and an egress label, and an address of a LDP peer entity at an opposite end, which is a next-hop IP address;

the MPLS table item managing module creating a forwarding-relation table, and adding a forwarding-relation table item based upon the obtained information;

obtaining an egress port corresponding to the forwarding-relation table item based upon the next-hop IP address; and accomplishing the MPLS via the egress port.

The step of the MPLS table item managing module creating the forwarding-relation table and adding the forwarding-relation table item based upon the obtained information may further comprise steps of:

creating a forwarding-relation table item of FTN for a label edge router (LER) in the VLAN, which indicates a mapping of a forwarding equivalence class (FEC) to a next-hop label forwarding entry (NHLFE); and creating an forwarding-relation table item of Incoming Label Map (ILM) for a label switch router (LSR) in the VLAN, wherein the forwarding-relation table item of ILM indicates a mapping of an ingress label to the NHLFE.

The step of obtaining the egress port corresponding to the forwarding-relation table item based upon the next-hop IP address may further comprise steps of:

the MPLS table item managing module searching an address resolution protocol (ARP) table based upon the next-hop IP address to judge whether there is a corresponding table item of ARP;

if there is a corresponding table item of ARP, establishing a correspondence relation of the forwarding-relation table item and a corresponding egress port and physical MAC address in the table item of ARP based upon information of the corresponding egress port and MAC address; and if there is no corresponding table item of ARP, marking the forwarding-relation table item with an UNAVAILABLE sign, and obtaining information of the egress port with a data flow which triggers a corresponding action based upon an actual data flow.

The step of obtaining the information of the egress port with the data flow if there is no corresponding table item of ARP may further comprise steps of:

transmitting an ARP broadcast request in the VLAN based upon the next-hop IP address and an egress interface VLAN;

receiving an ARP response message sent from the opposite end;

relearning and obtaining the egress port and MAC address corresponding to the next-hop IP address based upon the received ARP response message sent from the opposite end; and a maintaining and managing module of the VLAN notifying the MPLS table item managing module to update the information of the egress port corresponding to the forwarding-relation table item based upon the received ARP information.

The method further comprises steps of:

the MPLS table item managing module distributing the relevant forwarding-relation table item to the maintaining and managing module to create the forwarding-relation table maintained by the maintaining and managing module; and the maintaining and managing module maintaining a correspondence relation of the next-hop IP address and the forwarding-relation table item.

The step of the MPLS table item managing module distributing the relevant forwarding-relation table item to the maintaining and managing module may further comprise steps of:

for the LER in the VLAN, the MPLS table item managing module sending the information of the forwarding-relation table item of FTN to the intermediate processing module; and for the LSR in the VLAN, the MPLS table item managing module sending the information of the forwarding-relation table item of ILM to the intermediate processing module.

The step of the maintaining and managing module maintaining the correspondence for between the next-hop IP address and the forwarding-relation table item may further comprise steps of:

when an ARP is deleted, the maintaining and managing module notifying the MPLS table item managing module to update the forwarding-relation table item related to the ARP; and setting an INVALID flag bit for the forwarding-relation table item related to the ARP.

The step of setting the INVALID flag bit for the forwarding-relation table item related to the ARP may further comprise steps of:

in a distributed forwarding system, notifying micro-codes to set the INVALID flag bit for the forwarding-relation table item in the micro-codes which is related to the ARP; and in a non-distributed forwarding system, the MPLS table item managing module setting the INVALID flag bit for the forwarding-relation table item which is related to the ARP.

The step of the maintaining and managing module maintaining the correspondence relation of the next-hop IP address and the forwarding-relation table item may further comprise steps of:

when an ARP is newly created, the maintaining and managing module searching the forwarding-relation table maintained by itself as to whether there is a table item related to the ARP;

if not, no process being performed, otherwise judging whether a new egress port is consistent with the egress port corresponding to the original forwarding-relation table item; and if consistent, maintaining the original forwarding-relation table item, otherwise notifying the MPLS table item managing module to update the information of the egress port corresponding to the forwarding-relation table item.

In a distributed forwarding system, the method may further comprise a step of converting the forwarding-relation table item created by the MPLS table item managing module into a format required by micro-codes and distributing the forwarding-relation table item to the micro-codes.

With the present invention, it is possible to support the multi-port VLAN in the three-layer switch with the function of the MPLS and implement the MPLS in the VLAN.

PREFERRED EMBODIMENTS OF THE INVENTION

The present invention will be further detailed with reference to the embodiments in conjunction with the attached drawings.

Figure 1:
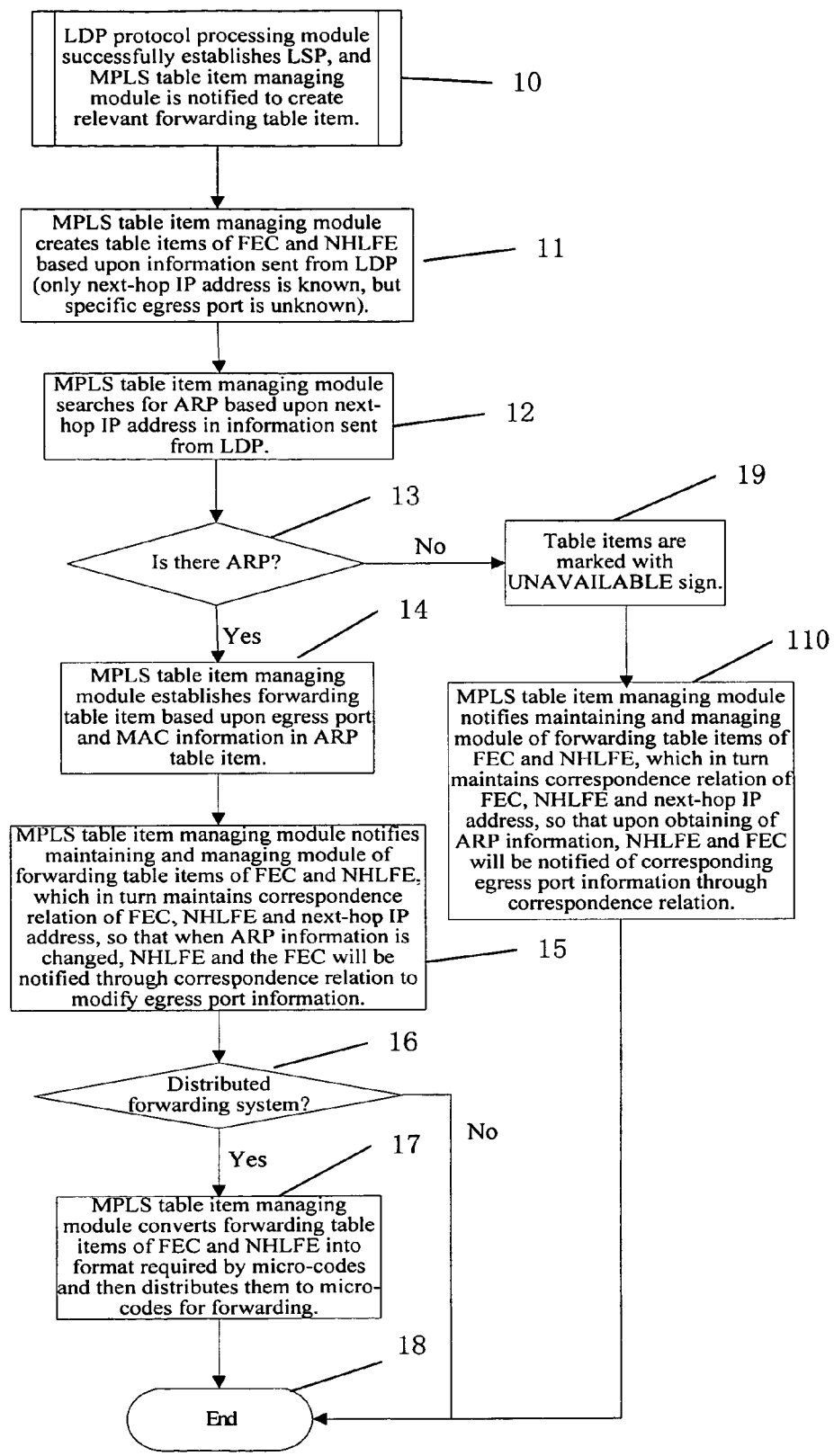
FIG. 1 is a flow chart showing steps in a method according to an embodiment of the invention, which are performed by a node in a multi-port VLAN serving as a LER so as to establish a forwarding-relation table item.

Referring to FIG. 1, it shows steps in the method according to the embodiment of the invention, which are performed by a node in a multi-port VLAN serving as a LER so as to complete the MPLS.

First in step 10, after the LSP is established by the LDP, the process obtains information binding a FEC and a label as well as an address of a LDP peer entity at an opposite end (i.e., a next-hop IP address), and a MPLS table item managing module is notified to create a forwarding-relation table item.

Then in step 11, the MPLS table item managing module creates the table items of FEC and NHLFE based upon the information sent from the LDP. Here, only the next-hop IP address is known, but a specific egress port is unknown.

In step 12, the MPLS table item managing module searches for the ARP based upon the next-hop IP address in the NHLFE.

In step 13, it is judged whether there exists an ARP corresponding to the next-hop IP address.

If the ARP exists, the process goes to step 14, where the MPLS table item managing module establishes the correspondence relation of the forwarding-relation table item and the corresponding egress port and MAC address based upon the egress port and MAC information in the ARP table item.

Then in step 15, the MPLS table item managing module notifies a maintaining and managing module of the forwarding table items of FEC and NHLFE, which in turn maintains the correspondence relation of the FEC, the NHLFE and the next-hop IP address, so that when the ARP information is changed, the NHLFE and the FEC will be notified through the correspondence relation so as to modify the egress port information.

For a distributed forwarding system that utilizes a technology separating the routing from the forwarding, the forwarding-relation table is required to be distributed to micro-codes in respective service boards. Thus, the process goes to step 16 where it is judged whether the system is such a distributed forwarding system.

If the system is the distributed forwarding system, then the process goes to step 17, where the MPLS table item managing module converts the forwarding table items of FEC and NHLFE into a format required by the micro-codes and then distributes them to the micro-codes for the forwarding.

Then in step 18, the process is completed for creating the forwarding-relation table item.

On the other hand, if the system is not the distributed forwarding system, the process goes directly to step 18 and is completed for creating the forwarding-relation table item.

If the ARP doesn't exist, it is impossible to obtain the egress port information, and the process goes to step 19, where the table items of FEC and NHLFE created by the MPLS table item managing module are marked with an UNAVAILABLE sign.

Then in step 110, the MPLS table item managing module notifies the maintaining and managing module of the forwarding table items of FEC and NHLFE, which in turn maintains the correspondence relation of the FEC, the NHLFE and the next-hop IP address, so that upon the obtaining of the ARP information, the NHLFE and the FEC will be notified of the corresponding egress port information through the correspondence relation.

Since there is no corresponding ARP at this time, the forwarding table items of FEC and NHLFE created by the MPLS table item managing module are unavailable. Therefore, in the distributed forwarding system, it is unnecessary to notify the micro-codes to add the corresponding table item. Instead, the process goes directly to step 18 and is completed for creating the forwarding-relation table item.

Figure 2:
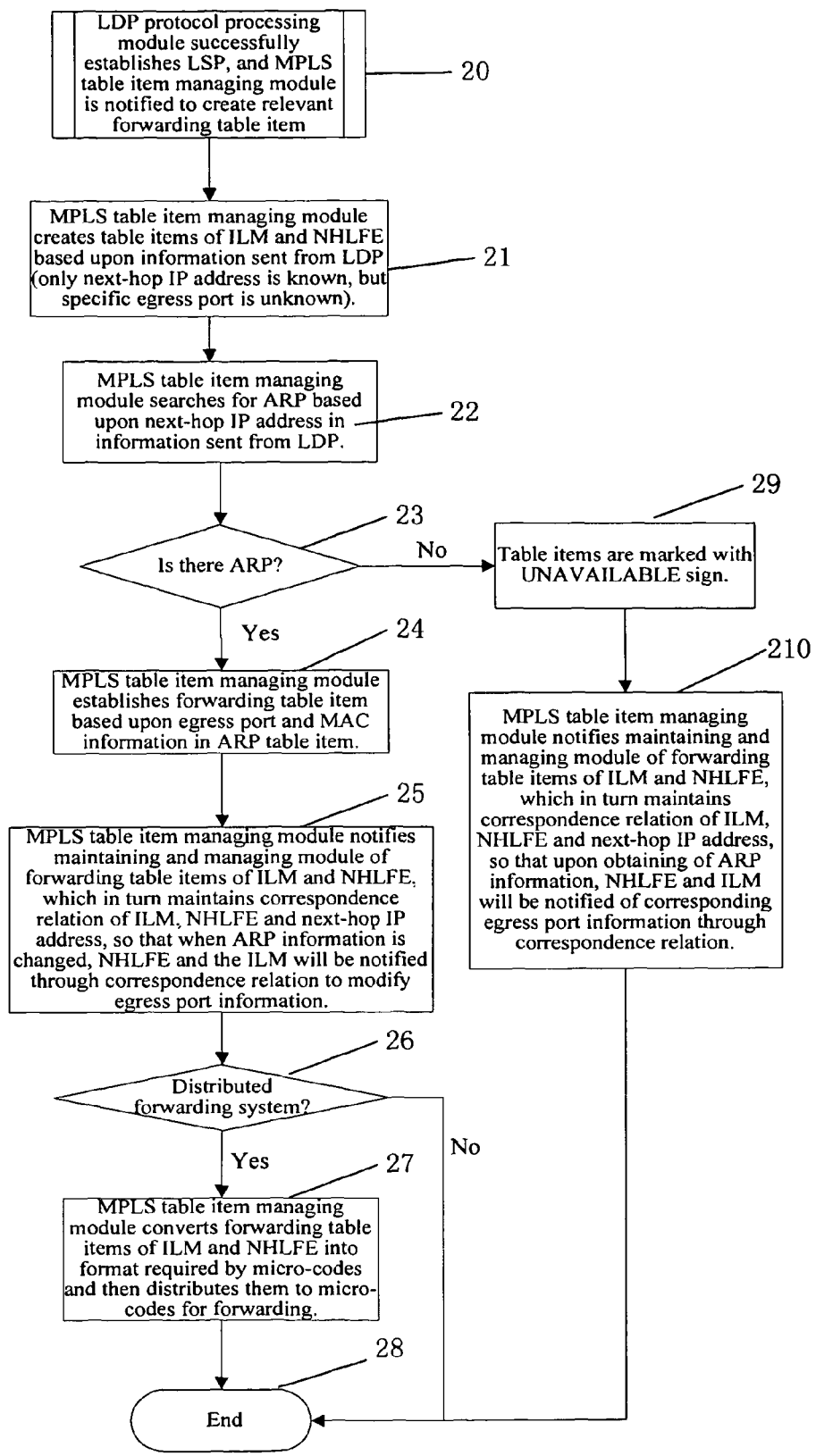
FIG. 2 is a flow chart showing steps in the method according to the embodiment of the invention, which are performed by a node in the multi-port VLAN serving as a LSR so as to establish a forwarding-relation table item.

In a LAN, there are many core nodes in addition to edge nodes. FIG. 2 shows steps in the method according to the embodiment of the invention, which are performed by a node in the multi-port VLAN serving as a LSR so as to complete the MPLS.

First in step 20, after the LSP is established by the LDP, the process obtains information binding an ingress label and an egress label as well as the address of the LDP peer entity at an opposite end (i.e., the next-hop IP address), and the MPLS table item managing module is notified to create the forwarding-relation table item.

Then in step 21, the MPLS table item managing module creates the table items of ILM and NHLFE based upon the information sent from the LDP. Here, only the next-hop IP address is known, but the specific egress port is unknown.

In step 22, the MPLS table item managing module searches for the ARP based upon the next-hop IP address in the NHLFE.

In step 23, it is judged whether there exists the ARP corresponding to the next-hop IP address.

If the ARP exists, the process goes to step 24, where the MPLS table item managing module establishes the correspondence relation of the forwarding-relation table item and the corresponding egress port and MAC address based upon the egress port and MAC information in the ARP table item.

Then in step 25, the MPLS table item managing module notifies the maintaining and managing module of the forwarding table items of ILM and NHLFE, which in turn maintains the correspondence relation of the ILM, the NHLFE and the next-hop IP address, so that when the ARP information is changed, the NHLFE and the ILM will be notified through the correspondence relation so as to modify the egress port information.

For the distributed forwarding system which utilizes the technology separating the routing from the forwarding, the forwarding-relation table is required to be distributed to the micro-codes in the respective service boards. Thus, the process goes to step 26, where it is judged whether the system is such a distributed forwarding system.

If the system is the distributed forwarding system, then the process goes to step 27, where the MPLS table item managing module converts the forwarding table items of ILM and NHLFE into the format required by the micro-codes and then distributes them to the micro-codes for the forwarding.

In step 28, the process is completed for creating the forwarding-relation table item.

On the other hand, if the system is not the distributed forwarding system, the process goes directly to step 28 and is completed for creating the forwarding-relation table item.

If the ARP doesn't exist, it is impossible to obtain the egress port information, and the process goes to step 29, where the table items of ILM and NHLFE created by the MPLS table item managing module are marked with the UNAVAILABLE sign.

Then in step 210, the MPLS table item managing module notifies the maintaining and managing module of the forwarding table item of ILM and NHLFE, which in turn maintains the correspondence relation of the ILM, the NHLFE and the next-hop IP address, so that when the ARP information is obtained, the NHLFE and the ILM will be notified of the corresponding egress port information through the correspondence relation.

Since there is no corresponding ARP at this time, the forwarding table items of ILM and NHLFE created by the MPLS table item managing module are unavailable. Therefore, in the distributed forwarding system, it is unnecessary to notify the micro-codes to add the corresponding table item. Instead, the process goes directly to step 28 and is completed for creating the forwarding-relation table item.

When the MPLS table item managing module has created the NHLFE but can't find the egress port, the entire forwarding table item is useless actually. In this case, it is required to first obtain the egress port in order to accomplish the MPLS. In the method according to the embodiment of the invention, a data flow is utilized to obtain the egress port, which will be detailed with reference to FIG. 3 and FIG. 4.

Figure 3:
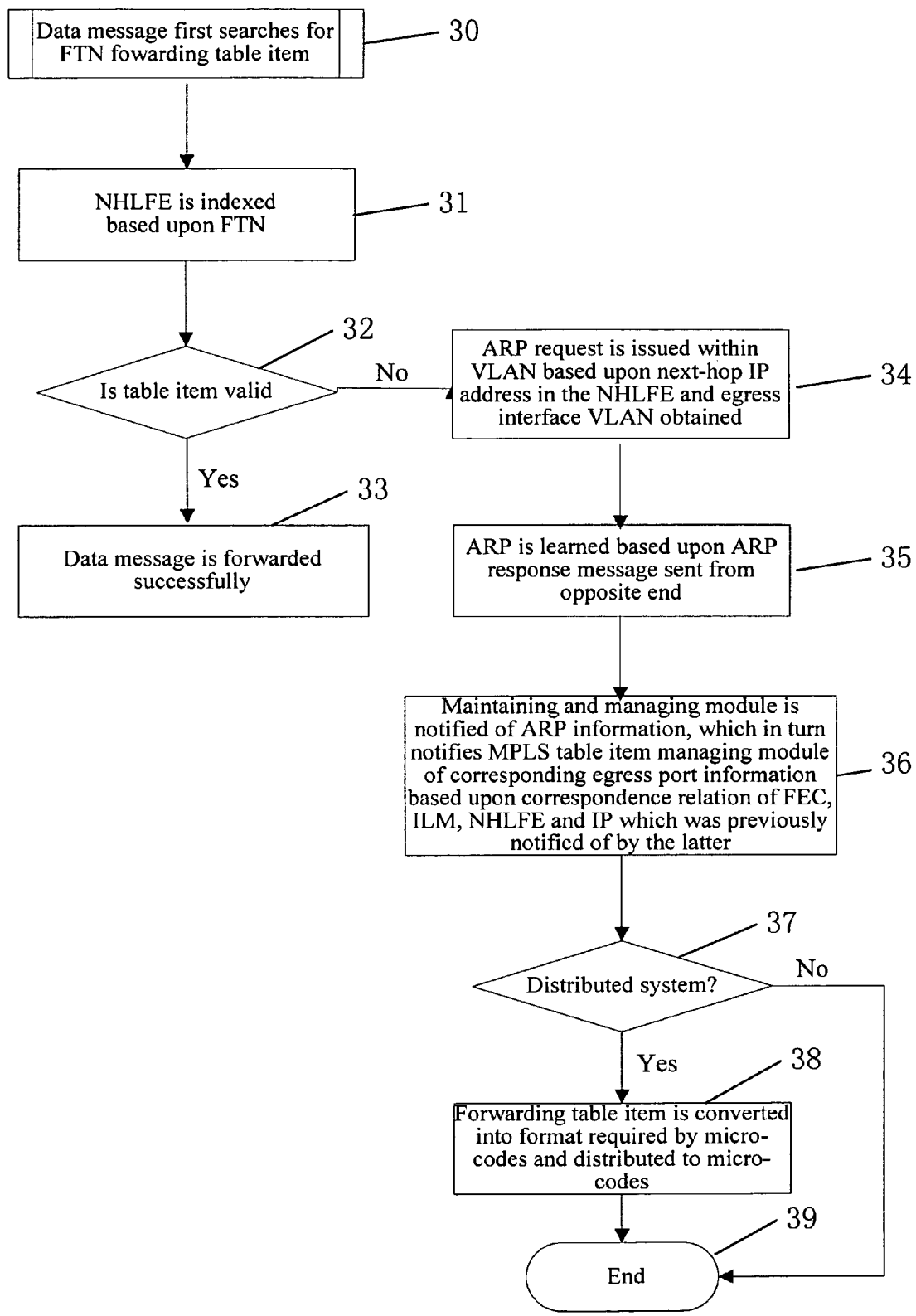
FIG. 3 is a flow chart showing steps in the method according to the embodiment of the invention, which are performed by the node in the multi-port VLAN serving as the LER so as to achieve the MPLS and obtain an egress port through a data flow.

Referring to FIG. 3, it is a flow chart showing steps in the method according to the embodiment of the invention, which are performed by the node in the multi-port VLAN serving as the LER so as to achieve the MPLS and obtain the egress port through the data flow.

For the LER, the forwarding table items are FTN and NHLFE, wherein the FTN table item is a mapping of the FEC to the NHLFE.

First in step 30, the data message to be forwarded searches for the FTN table item.

Then in step 31, the NHLFE is indexed based upon the FTN;

In step 32, it is judged whether the table item is valid based upon the above sign of the table item, and if there is no UNAVAILABLE sign for the table item, it can be judged the table item is valid.

If the table item is valid, the process goes to step 33 and accomplishes the forwarding of the datagram.

If the table item is invalid, indicating that there is no egress port but the next-hop IP address and the three-layer interface index, i.e., the interface index of the VLAN interface, then the process goes to step 34, where an ARP request is issued within the VLAN based upon the next-hop IP address in the NHLFE and an egress interface VLAN obtained from the three-layer interface index.

Then in step 35, the MAC address and the egress port are learned again corresponding to the next-hop IP address based upon an ARP response message sent from the opposite end.

In step 36, the maintaining and managing module is notified of the ARP, which in turn notifies the MPLS table item managing module of the egress port information corresponding to the table item based upon the correspondence relation of the FEC, the ILM, the NHLFE and the IP which was previously sent from the latter. Thus, the egress port and MAC information is retrieved through the data flow, and the MPLS table item managing module establishes the correspondence relation of the forwarding-relation table item and the corresponding egress port and MAC address based upon the egress port and MAC information in the ARP table item.

For the distributed forwarding system which utilizes the technology separating the routing from the forwarding, the forwarding-relation table is required to be distributed to the micro-codes in the respective service boards. Thus, the process goes to step 37 where it is judged whether the system is such a distributed forwarding system.

If the system is the distributed forwarding system, then the process goes to step 38, where the MPLS table item managing module converts the forwarding table item into the format required by the micro-codes and then distributes it to the micro-codes for the forwarding.

In step 39, the process is completed for creating the forwarding-relation table item, wherein the created forwarding-relation table item and the established the correspondence relation of the forwarding-relation table item and the corresponding egress port and MAC address are the same as those in the above steps 18 and 28.

On the other hand, if the system is not the distributed forwarding system, the process goes directly to step 39 and is completed for creating the forwarding-relation table item.

Figure 4:
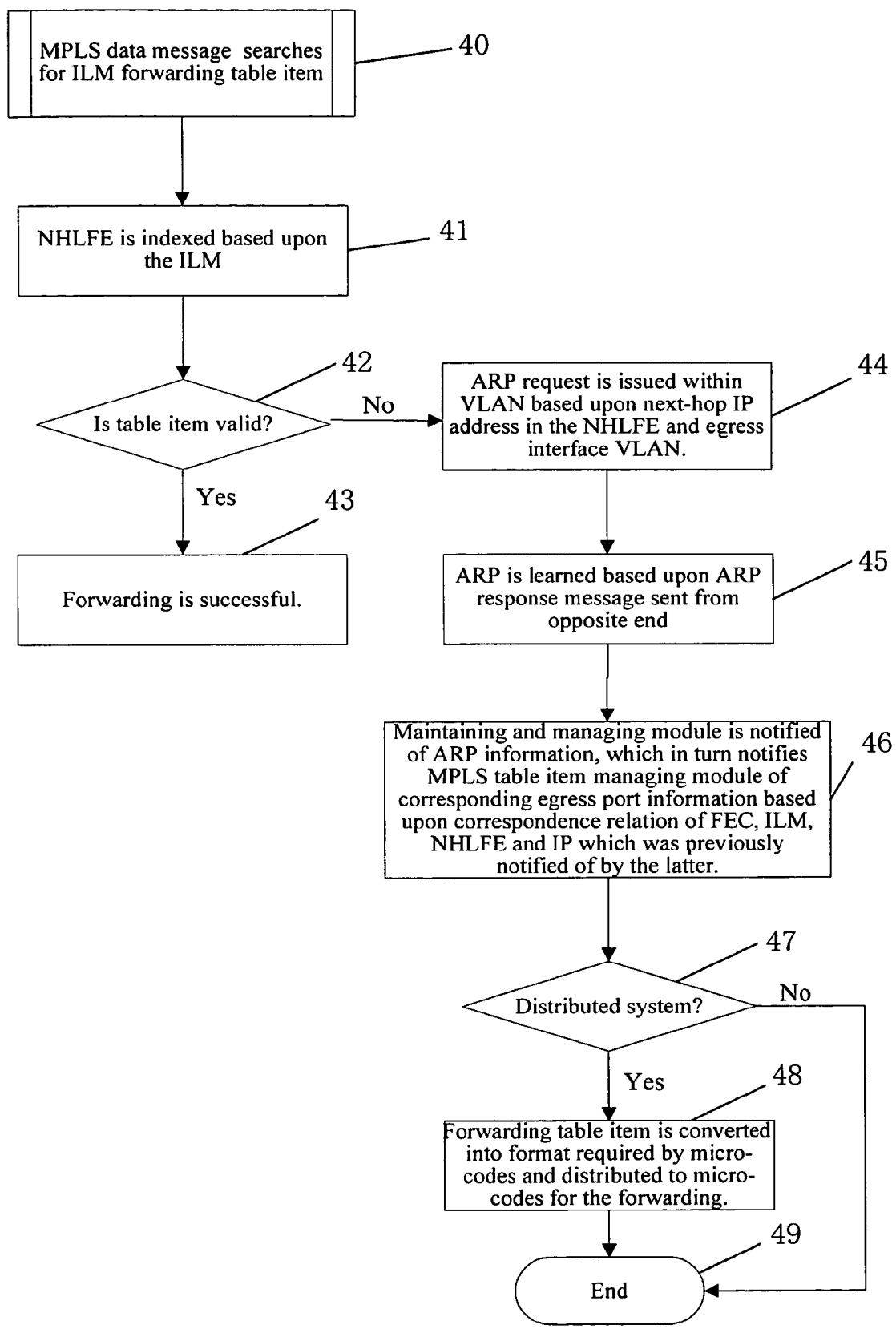
FIG. 4 is a flow chart showing steps in the method according to the embodiment of the invention, which are performed by the node in the multi-port VLAN serving as the LSR so as to achieve the MPLS and obtain an egress port through a data flow.

Similarly, FIG. 4 is a flow chart showing steps in the method according to the embodiment of the invention, which are performed by the node in the multi-port VLAN serving as the LSR so as to achieve the MPLS and obtain the egress port through the data flow.

For the LSR, the forwarding table items are ILM and NHLFE, wherein the ILM table item is a mapping of the ingress label to the NHLFE.

First in step 40, the MPLS data message searches for the ILM table item based upon the label.

Then in step 41, the NHLFE is indexed based upon the ILM.

In step 42, it is judged whether the table item is valid based upon the above sign of the table item, and if there is no UNAVAILABLE sign for the table item, it can be judged the table item is valid.

If the table item is valid, the process goes to step 43 and accomplishes the forwarding of the MPLS datagram.

If the table item is invalid, indicating that there is no egress port but the next-hop IP address and the three-layer interface index, i.e., the interface index of the VLAN interface, then the process goes to step 44, where the ARP request is issued within the VLAN based upon the next-hop IP address in the NHLFE and the egress interface VLAN obtained from the three-layer interface index.

Then in step 45, the MAC address and the egress port are learned again corresponding to the next-hop address based upon an ARP response message sent from the opposite end.

In step 46, the maintaining and managing module is notified of the ARP, which in turn notifies the MPLS table item managing module of the egress port information corresponding to the table item based upon the correspondence relation of the FEC, the ILM, the NHLFE and the IP which was previously sent from the latter. Thus, the egress port and MAC information is retrieved through the data flow, and the MPLS table item managing module establishes the correspondence relation of the forwarding-relation table item and the corresponding egress port and MAC address based upon the egress port and MAC information in the ARP table item.

For the distributed forwarding system which utilizes the technology separating the routing from the forwarding, the forwarding-relation table is required to be distributed to the micro-codes in the respective service boards. Thus, the process goes to step 47 where it is judged whether the system is such a distributed forwarding system.

If the system is the distributed forwarding system, then the process goes to step 48, where the MPLS table item managing module converts the forwarding table item into the format required by the micro-codes and then distributes it to the micro-codes for the forwarding.

In step 49, the process is completed for creating the forwarding-relation table item, and the created forwarding-relation table item and the established the correspondence relation of the forwarding-relation table item and the corresponding egress port and MAC address are the same as those in the above steps 18 and 28.

On the other hand, if the system is not the distributed forwarding system, the process goes directly to step 49 and is completed for creating the forwarding-relation table item.

Figure 5:
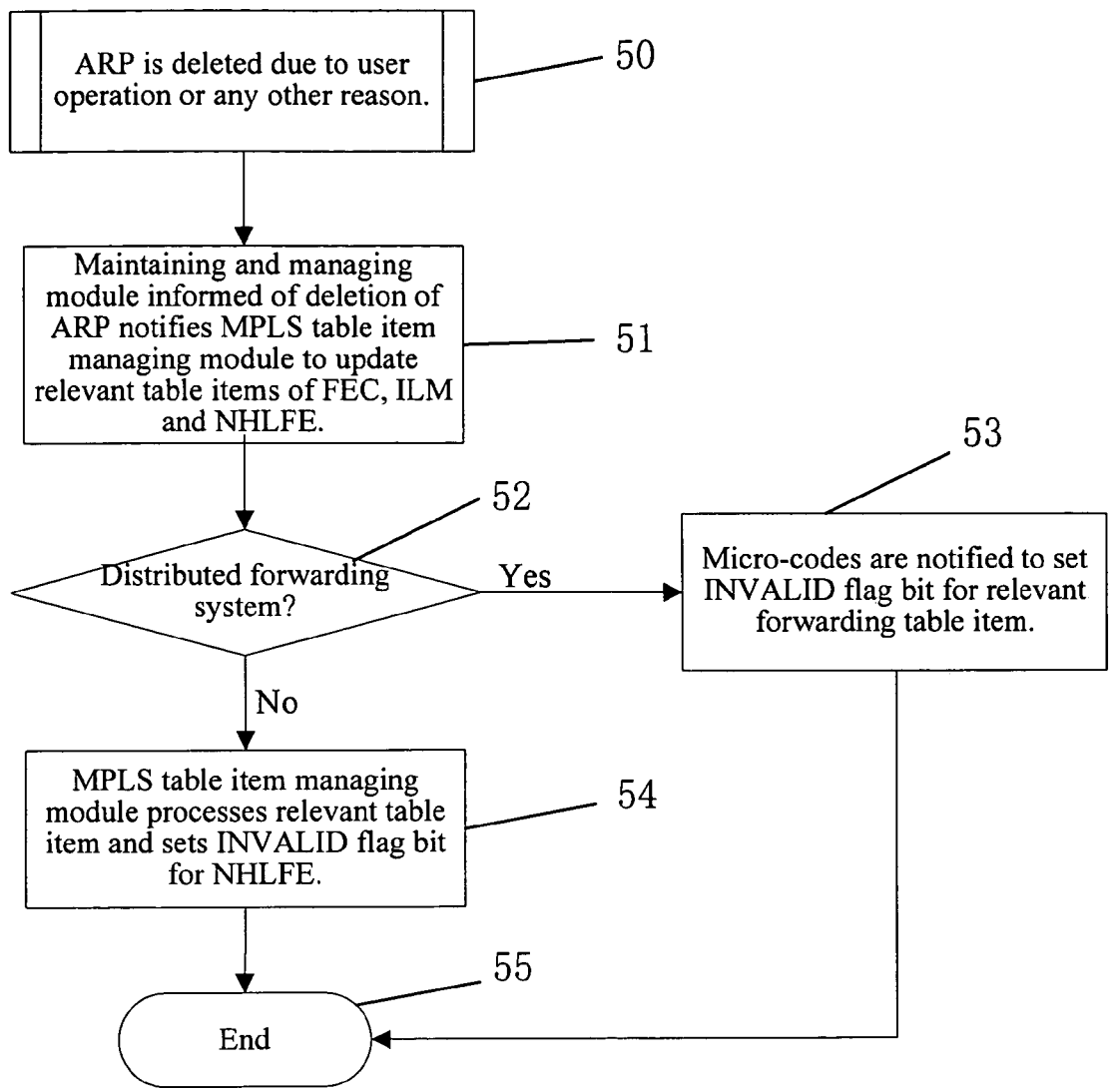
FIG. 5 is a flow chart showing steps in the method according to the embodiment of the invention, which are performed so as to maintain forwarding information when an ARP is deleted.
Figure 6:
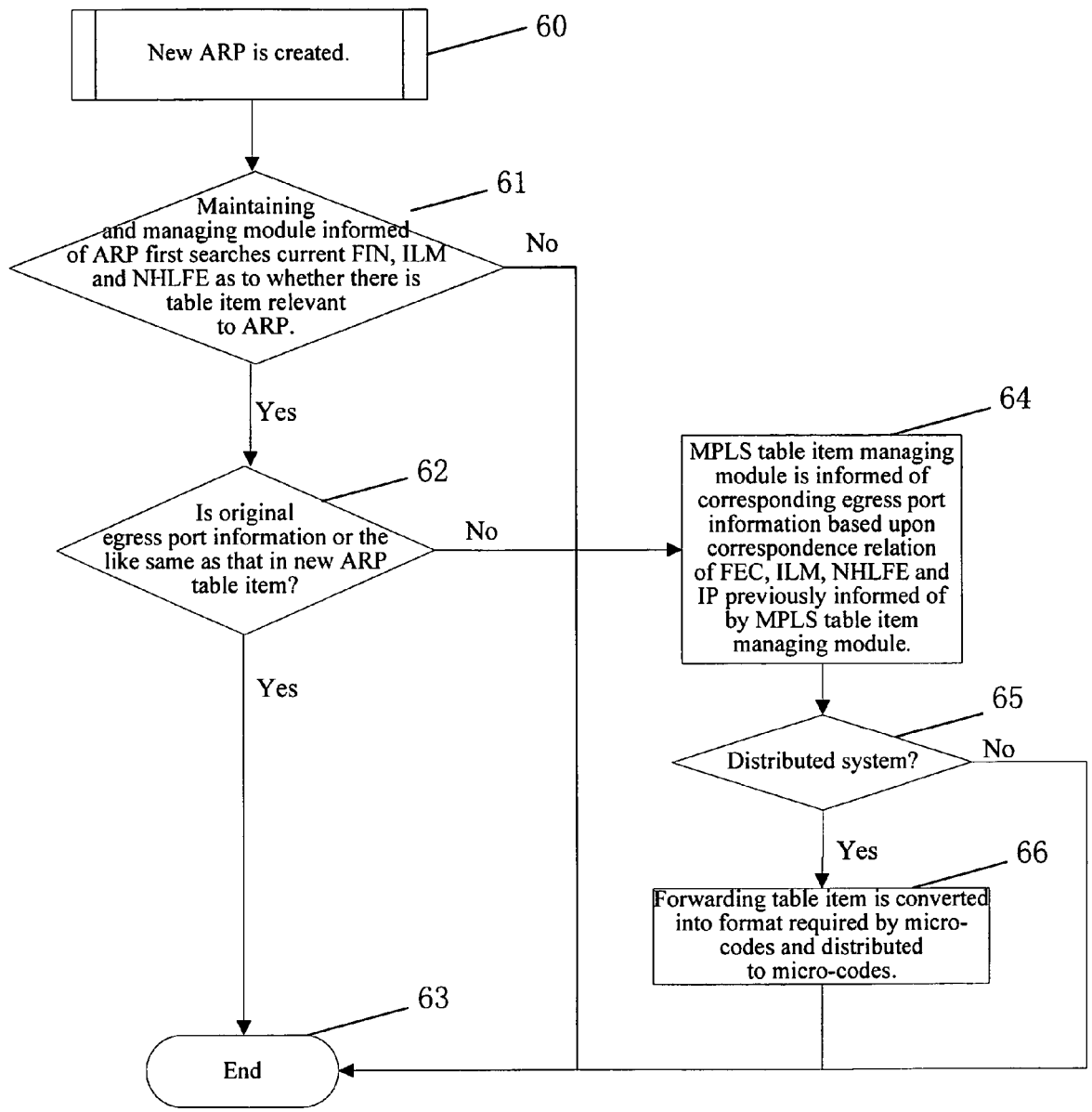
FIG. 6 is a flow chart showing steps in the method according to the embodiment of the invention, which are performed so as to maintain forwarding information when an ARP is deleted.

During the implementation of the MPLS, an ARP may be deleted or created In this case, the forwarding-relation table item is required be updated. In order to avoid the impact on the MPLS forwarding table item due to the repeated ARP jittering in an unstable port state, the MPLS table item will be subject to a change only when the egress port corresponding to the ARP is changed in accordance with the embodiment of the invention. FIG. 5 and FIG. 6 show in detail a maintenance process of the MPLS table item according to the embodiment of the invention.

Referring to FIG. 5, FIG. 5 is a flow chart showing steps in the method according to the embodiment of the invention, which are performed so as to maintain forwarding information when an ARP is deleted.

First in step 50, the ARP is deleted due to a user operation or any other reason. At this time, the binding relation of the next-hop IP address and the egress port becomes invalid, and also the corresponding forwarding-relation table item becomes invalid accordingly.

In step 51, upon being informed of the deletion of the ARP, the maintaining and managing module notifies the MPLS table item managing module to update the relevant table items of FEC, ILM and NHLFE.

Then in step 52, it is judged whether the system is the distributed forwarding system.

If the system is the distributed forwarding system, the process goes to step 53, where only the micro-codes are notified to set an INVALID flag bit for the relevant forwarding table item, indicating a disabled forwarding at this time, and no operation will be performed on the relevant forwarding table item of a upper layer.

Then in step 55, the process terminates the process of maintaining the forwarding table item.

On the other hand, if the system is not the distributed forwarding system, the process goes to step 54, where the MPLS table item managing module processes the relevant table item and sets the INVALID flag bit for the NHLFE, indicating the disabled forwarding at this time.

Then in step 55, the process terminates the process of maintaining the forwarding table item.

It can be seen from the above descriptions that when the ARP is deleted, the corresponding forwarding-relation table item is not deleted directly but marked with the INVALID flag, indicating the disabled forwarding at this time. Similarly, such a case of being marked with the INVALID flag applies to a single-port VLAN.

Referring to FIG. 6, it is a flow chart showing steps in the method according to the embodiment of the invention, which are performed so as to maintain forwarding information when a new ARP is created.

First in step 60, the new ARP is created.

Then in step 61, upon being informed of the new ARP and based upon the IP address in the ARP table item, the maintaining and managing module searches the forwarding-relation table maintained by itself to determine whether there is the same table item as the IP address in the new ARP table item.

If not, the process goes to step 63 and terminates the process of maintaining the forwarding table item.

Otherwise, the process goes to step 62, where it is judged whether the egress port in the table item, which is relevant to the new ARP, from the forwarding-relation table maintained by itself is consistent with the egress port in the new ARP.

If both are consistent with each other, then the process does not necessarily modify the forwarding-relation table item of the upper layer, but goes to step 63 and terminates the process of maintaining the forwarding table item.

Otherwise, the process goes to step 64, where the MPLS table item managing module is informed to update the corresponding egress port information, based upon the correspondence relation with respect to the FEC, the ILM, the NHLFE and the IP among the table items relevant to the new ARP.

Then in step 65, it is judged whether the system is the distributed forwarding system.

If the system is the distributed forwarding system, the process goes to step 66, where the forwarding table item is converted into the format required by the micro-codes and distributed to the micro-codes.

Then, the process goes to step 63 and terminates the process of maintaining the forwarding table item.

On the other hand, if the system is not the distributed forwarding system, the process goes directly to step 63 and terminates the process of maintaining the forwarding table item.

It can be seen from the above descriptions that when the ARP is added or deleted frequently but the actual egress port is unchanged, all the MPLS forwarding table items remain changeless. Only when the egress port corresponding to the ARP is changed, will the MPLS item be subject to a change, thus avoiding unproductive addition or deletion of any MPLS forwarding table item.

Figure 7:
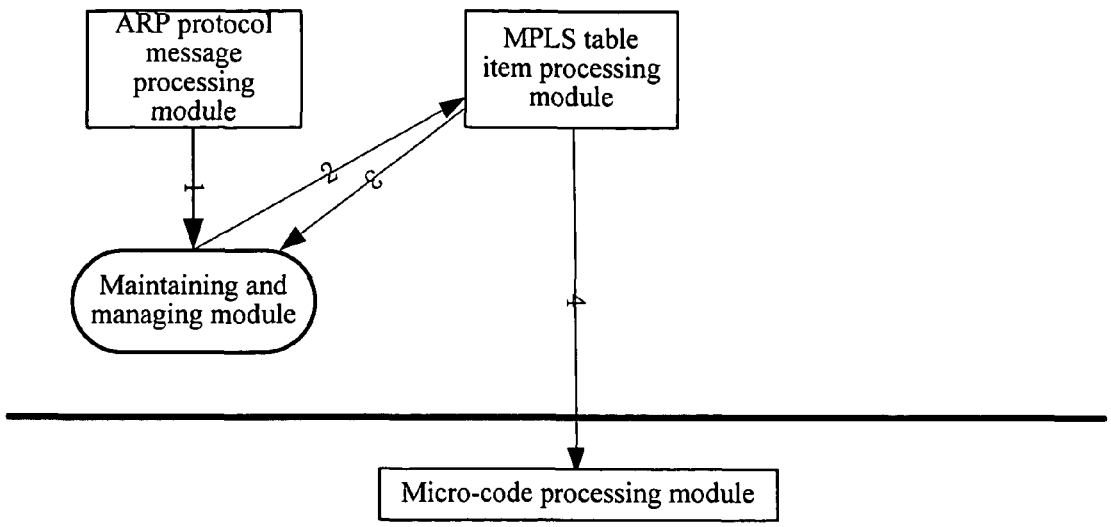
FIG. 7 is a schematic diagram showing the relation between a MPLS table item managing module with a multi-port feature and other modules in the method according to the embodiment of the invention.
Figure 8:
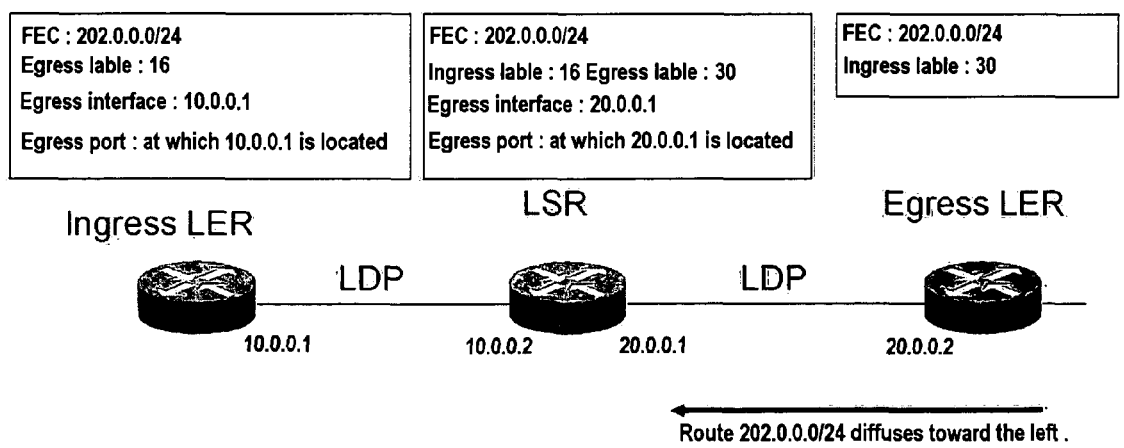
FIG. 8 is a schematic diagram showing a network configuration test of the MPLS in the prior art.

According to the embodiment of the present invention, the maintaining and managing module not only interfaces with the modules responsible for generating the forwarding table items and accepts a request to add or delete a table item from the latter, but also takes charge of maintaining synchronization at the time of any change of the egress interface corresponding to the next hop, and notifies the relevant modules including the MPLS table item managing module to update the relevant forwarding table item. FIG. 7 shows the following relations between the modules.

1. The ARP protocol packet processing module notifies the maintaining and managing module during the process of adding, deleting or updating an ARP table item.

2. Upon obtaining the relevant information of the egress port corresponding to the next hop, the maintaining and managing module is required to traverses the NHLFE and the FTN related to the structure of internal data, and invokes interface functions provided by the MPLS table item processing module to perform operations of processing and distributing the relevant table items.

3. Prior to the distribution of the table item in the respective flows, the MPLS table item processing module first invokes the interface functions provided by the maintaining and managing module, and searches for the relevant egress port index information based upon the next-hop IP address and the egress interface index. Additionally, the interface functions provided by the maintaining and managing module are required to invoke at the time of the maintenance of the relevant NHLFE and FTN so as to correlate the nodes with their structures of internal data.

4. The MPLS table item processing module notifies the micro-codes to perform the operation of distributing the NHLFE and FTN table items.

While the present invention has been described with reference to the embodiments, it will be apparent to those skilled in the art that various variations and modifications are possible without departing from the spirit of the invention, all of which fall into the scope of the present invention as defined in the following claims.

What is claimed:

1. A Multi-Protocol Label Switch (MPLS) processing method applied in a multi-port Virtual Local Area Network (VLAN), wherein the VLAN includes a node with a MPLS table item managing module and the method comprises:

establishing a label switch path (LSP), by the node n the multi-port VLAN, through a label distribution protocol (LDP), and obtaining an address of a LDP peer entity at an opposite end and information binding a forwarding equivalence class (FEC) and a label or obtaining the address of the LDP peer entity at the opposite end and information binding an ingress label and an egress label wherein the address of the LDP peer entity at the opposite end is a next hop address;

creating, by the MPLS table item managing module, a forwarding-relation table, and adding a forwarding-relation table item based upon the obtained information;

obtaining, by the MPLS table item managing module, a specific egress port corresponding to the forwarding-relation table item from the multiple ports of the VLAN based upon the next-hop IP address; and accomplishing, by the node in the multi-port VLAN, the MPLS via the specific egress port;

wherein obtaining a specific egress port corresponding to the forwarding-relation table item from the multiple ports of the VLAN based upon the next-hop IP address comprises:

the MPLS table item managing module searching an address resolution protocol (ARP) table based upon the next-hop IP address to judge whether there is a corresponding table item of ARP;

if there is a corresponding table item of ARP, the MPLS table item managing module establishes a correspondence relation of the forwarding-relation table item and a corresponding egress port and physical MAC address in the table item of ARP based upon information of the corresponding egress port and MAC address; and if there is no corresponding table item of ARP, the MPLS table item managing module marks the forwarding-relation table item with an UNAVAILABLE sign, transmits an ARP broadcast request in the VLAN based upon the next-hop IP address and an egress interface VLAN, receives an ARP response message sent from the opposite end, relearns and obtains the egress port and MAC address corresponding to the next-hop IP address based upon the received ARP response message sent from the opposite end, and a maintaining and managing module of the VLAN notifies the MPLS table item managing module to update the information of the egress port corresponding to the forwarding-relation table item based upon the received ARP information.

2. The method according to claim 1, wherein the step of the MPLS table item managing module creating the forwarding-relation table and adding the forwarding-relation table item based upon the obtained information further comprises steps of:

creating a forwarding-relation table item of FTN for a label edge router (LER) in the VLAN, which indicates a mapping of a forwarding equivalence class (FEC) to a next-hop label forwarding entry (NHLFE); and creating an forwarding-relation table item of Incoming Label Map (ILM) for a label switch router (LSR) in the VLAN, wherein the forwarding-relation table item of ILM indicates a mapping of an input label to the NHLFE.

3. The method according to claim 1, wherein further comprising steps of:

the MPLS table item managing module distributing the relevant forwarding-relation table item to the maintaining and managing module to create the forwarding-relation table maintained by the maintaining and managing module; and the maintaining and managing module maintaining a correspondence relation of the next-hop IP address and the forwarding-relation table item.

4. The method according to claim 3, wherein the step of the MPLS table item managing module distributing the relevant forwarding-relation table item to the maintaining and managing module further comprises steps of:

for the LER in the VLAN, the MPLS table item managing module sending the information of the forwarding-relation table item of FTN to the maintaining and managing module; and for the LSR in the VLAN, the MPLS table item managing module sending the information of the forwarding-relation table item of ILM to the maintaining and managing module.

5. The method according to claim 3, wherein the step of the maintaining and managing module maintaining the correspondence relation of the next-hop IP address and the forwarding-relation table item further comprises steps of:

when an ARP is deleted, the maintaining and managing module notifying the MPLS table item managing module to update the forwarding-relation table item related to the ARP; and setting an INVALID flag bit for the forwarding-relation table item related to the ARP.

6. The method according to claim 5, wherein the step of setting the INVALID flag bit for the forwarding-relation table item related to the ARP further comprises steps of:

in a distributed forwarding system, notifying micro-codes to set the INVALID flag bit for the forwarding-relation table item in the micro-codes which is related to the ARP; and in a non-distributed forwarding system, the MPLS table item managing module setting the INVALID flag bit for the forwarding-relation table item which is related to the ARP.

7. The method according to claim 3, wherein the step of the maintaining and managing module maintaining the correspondence relation of the next-hop IP address and the forwarding-relation table item further comprises steps of:

when an ARP is newly created, the maintaining and managing module searching the forwarding-relation table maintained by itself as to whether there is a table item related to the ARP;

if not, no process being performed, otherwise judging whether a new egress port is consistent with the egress port corresponding to the original forwarding-relation table item; and if consistent, maintaining the original forwarding-relation table item, otherwise notifying the MPLS table item managing module to update the information of the egress port corresponding to the forwarding-relation table item.

8. The method according to claim 1, wherein in a distributed forwarding system, the method further comprises a step of converting the forwarding-relation table item created by the MPLS table item managing module into a format required by micro-codes and distributing the forwarding-relation table item to the micro-codes 1.

* * * * *